United States Patent
Jang et al.

(10) Patent No.: US 12,313,474 B2
(45) Date of Patent: May 27, 2025

(54) SEMICONDUCTOR-BASED TEMPERATURE SENSOR AND METHOD OF OPERATING THE SAME

(71) Applicant: ELECTRONICS AND TELECOMMUNICATIONS RESEARCH INSTITUTE, Daejeon (KR)

(72) Inventors: Seunghyun Jang, Daejeon (KR); Sunwoo Kong, Daejeon (KR); Bong Hyuk Park, Daejeon (KR); Hui Dong Lee, Daejeon (KR); Seok Bong Hyun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 497 days.

(21) Appl. No.: 17/743,072

(22) Filed: May 12, 2022

(65) Prior Publication Data

US 2022/0373403 A1    Nov. 24, 2022

(30) Foreign Application Priority Data

May 18, 2021    (KR) .................. 10-2021-0064282

(51) Int. Cl.
G01K 7/00    (2006.01)
G01K 3/08    (2006.01)
G01K 7/01    (2006.01)

(52) U.S. Cl.
CPC .............. G01K 3/08 (2013.01); G01K 7/01 (2013.01); *G01K 2219/00* (2013.01)

(58) Field of Classification Search
CPC ........ G01K 3/08; G01K 7/01; G01K 2219/00; G01K 15/005; G01K 3/005; G01K 7/021; G05F 1/10

See application file for complete search history.

(56) References Cited

U.S. PATENT DOCUMENTS 6,900,689 B2 *  5/2005  Kimura .................. G05F 3/262
                                                327/542
7,944,360 B2    5/2011  Kim et al.
(Continued)

FOREIGN PATENT DOCUMENTS

CN    102338669 A  *  2/2012  ............... G01K 7/01
CN    109916524 A  *  6/2019
(Continued)

OTHER PUBLICATIONS

17743072_2024-10-09_EP_2295944_A2_H.pdf,Mar. 16, 2011.*
(Continued)

*Primary Examiner* — Gail Kaplan Verbitsky
(74) *Attorney, Agent, or Firm* — Rabin & Berdo, P.C.

(57) ABSTRACT

Provided are a semiconductor-based temperature sensor and a method of operating the semiconductor-based temperature sensor. A temperature sensor includes an electrical temperature signal generator configured to generate a first electrical temperature signal that changes according to temperature and a second electrical temperature signal that changes according to temperature at a different rate from that of the first electrical temperature signal, a differential signal generator configured to generate a differential electrical temperature signal between the first electrical temperature signal and the second electrical temperature signal, and an analog digital converter (ADC) configured to convert the differential electrical temperature signal into digital temperature information.

12 Claims, 12 Drawing Sheets

(56) References Cited

U.S. PATENT DOCUMENTS

| | | | |
|---|---|---|---|
| 9,068,896 B2 | 6/2015 | Yun et al. | |
| 9,582,021 B1 * | 2/2017 | Arnold | G05F 3/16 |
| 9,846,446 B2 * | 12/2017 | Choi | G05F 3/267 |
| 9,996,100 B2 * | 6/2018 | Shin | G05F 3/242 |
| 10,216,213 B2 * | 2/2019 | Chu | G11C 5/14 |
| 10,642,305 B2 | 5/2020 | Lee et al. | |
| 2007/0195856 A1 * | 8/2007 | Blom | G01K 7/01 374/E7.035 |
| 2009/0110027 A1 * | 4/2009 | Chellappa | G01K 7/01 374/163 |
| 2013/0272341 A1 | 10/2013 | Lee et al. | |
| 2013/0294481 A1 * | 11/2013 | Koyama | G01K 7/01 374/163 |
| 2016/0047696 A1 * | 2/2016 | Ramaraju | G01K 7/01 374/170 |
| 2019/0316973 A1 | 10/2019 | Ippolito et al. | |
| 2021/0199515 A1 * | 7/2021 | Schemm | G05B 11/018 |

FOREIGN PATENT DOCUMENTS

| | | | | |
|---|---|---|---|---|
| EP | 2295944 | A2 * | 3/2011 | G01K 7/015 |
| ES | 2674444 | T3 * | 6/2018 | G01K 13/00 |
| GB | 2191292 | A * | 12/1987 | G01K 15/00 |
| JP | 2010002562 | A * | 1/2010 | |
| JP | 3532834 | B2 * | 6/2018 | H03F 1/302 |
| KR | 20080092508 | A * | 10/2008 | |
| KR | 101126093 | B1 * | 3/2012 | |
| KR | 20150027414 | A | 3/2015 | |
| KR | 10-2019-0059184 | A | 5/2019 | |
| KR | 10-2019-0106190 | A | 9/2019 | |
| WO | WO-2022040928 | A1 * | 3/2022 | G01J 1/44 |

OTHER PUBLICATIONS

17743072_2024-10-09_KR_20080092508_A_H.pdf,,Oct. 16, 2008.*
17743072_2024-10-10_CN_102338669_A_H.pdf,Feb. 1, 2012.*
17743072_2024-10-10_CN_109916524_A_H.pdf,Jun. 21, 2019.*
17743072_2024-10-10_CN_110514314_A_H.pdf,Nov. 29, 2019.*
17743072_2024-10-10_ES_2674444_T3_H.pdf,Jun. 29, 2018.*
17743072_2024-10-10_JP_3532834_B2_H.pdf,Jun. 29, 2018.*
17743072_2024-10-11_KR_101126093_B1_H.pdf,Mar. 29, 2012.*
17743072_2024-10-21_JP_2010002562_A_H.pdf,Jan. 7, 2010.*
17743072_2025-02-12_GB_2191292_A_H.pdf,Dec. 9, 1987.*
17743072_2025-02-12_WO_2022040928_A1_H.pdf,Mar. 3, 2022.*

* cited by examiner

SEMICONDUCTOR-BASED TEMPERATURE SENSOR AND METHOD OF OPERATING THE SAME

CROSS-REFERENCE TO RELATED APPLICATION

This application claims the benefit of Korean Patent Application No. 10-2021-0064282 filed on May 18, 2021, in the Korean Intellectual Property Office, the entire disclosure of which is incorporated herein by reference for all purposes.

BACKGROUND

1. Field of the Invention

One or more example embodiments relate to a temperature sensor and a method of operating the temperature sensor, and more particularly, to a temperature sensor capable of sensing a temperature in a semiconductor, and a method of operating the temperature sensor.

2. Description of the Related Art

Electronic devices including mobile devices use various semiconductor chips. Semiconductor chips inevitably generate heat while consuming power, and the generated heat may affect the performance of surrounding semiconductors. In addition, the performance of a semiconductor may change depending on an external temperature around the electronic device.

In addition, several blocks may exist even within one semiconductor, and a difference in heat generation may exist due to a difference in power consumption between the blocks. Accordingly, the blocks may affect each other's performance even within a semiconductor.

Therefore, in order to resolve a issue associated with deterioration of semiconductor performance caused by temperature, there is a demand for a semiconductor-based temperature sensor capable of sensing a temperature in a semiconductor.

SUMMARY

Example embodiments provide an apparatus of simplifying a structure of a temperature sensor by converting a differential electrical temperature signal into digital temperature information using, as a reference signal, one of a first electrical temperature signal and a second electrical temperature signal outputted by an electrical temperature signal generator without using an additional circuit for generating a signal having a predetermined value with respect to a change in temperature, and a method of operating the apparatus.

In addition, example embodiments provide an apparatus of reducing a semiconductor area for implementing a temperature sensor by simplifying a structure using one of a first electrical temperature signal and a second electrical temperature signal as a reference signal for converting a differential electrical temperature signal into digital temperature information, and a method of operating the apparatus.

In addition, example embodiments provide an apparatus of reducing power required for driving a temperature sensor by simplifying a structure using one of a first electrical temperature signal and a second electrical temperature signal as a reference signal for converting a differential electrical temperature signal into digital temperature information, and a method of operating the apparatus.

According to an aspect, there is provided a temperature sensor including an electrical temperature signal generator configured to generate a first electrical temperature signal that changes according to temperature and a second electrical temperature signal that changes according to temperature at a different rate from that of the first electrical temperature signal, a differential signal generator configured to generate a differential electrical temperature signal between the first electrical temperature signal and the second electrical temperature signal, and an analog digital converter (ADC) configured to convert the differential electrical temperature signal into digital temperature information.

The temperature sensor may further include a switch configured to select one of the first electrical temperature signal and the second electrical temperature signal, and output the selected electrical temperature signal as a reference electrical temperature signal. The ADC may be configured to perform analog-to-digital conversion on the differential electrical temperature signal using the reference electrical temperature signal as a reference signal.

The switch may be configured to alternatingly select the first electrical temperature signal and the second electrical temperature signal so that the reference electrical temperature signal has an average value of the first electrical temperature signal and the second electrical temperature signal.

The first electrical temperature signal and the second electrical temperature signal may be analog signals including a proportional to absolute temperature (PTAT) characteristic having a positive (+) coefficient with respect to temperature. The differential electrical temperature signal may be an analog signal including a complementary to absolute temperature (CTAT) characteristic having a negative (−) coefficient with respect to temperature.

The first electrical temperature signal and the second electrical temperature signal may be analog signals including a CTAT characteristic having a negative (−) coefficient with respect to temperature. The differential electrical temperature signal may be an analog signal including a PTAT characteristic having a positive (+) coefficient with respect to temperature.

According to another aspect, there is provided a temperature sensor including an electrical temperature signal generator configured to generate a first electrical temperature signal that changes according to temperature, and a second electrical temperature signal that changes according to temperature at a different rate from that of the first electrical temperature signal, a switch configured to select one of the first electrical temperature signal and the second electrical temperature signal, and output the selected electrical temperature signal as a reference electrical temperature signal, a differential signal gain generator configured to generate a differential electrical temperature signal between the first electrical temperature signal and the second electrical temperature signal, and output a gain so that a sum of the reference electrical temperature signal and the differential electrical temperature has a predetermined value with respect to a change in temperature, and an ADC configured to convert the differential electrical temperature signal into digital temperature information using, as a reference signal, the reference electrical temperature signal and a sum of the differential electrical temperature and the gain.

According to still another aspect, there is provided a temperature sensor including an electrical temperature signal generator configured to generate a first electrical temperature signal with a voltage that decreases according to an increase in temperature, and a second electrical temperature signal with a voltage that decreases according to an increase in temperature, the voltage with a slope different from a slope of the voltage of the first electrical temperature signal, using a bipolar junction transistor (BJT), a differential signal generator configured to generate a differential electrical temperature signal between the first electrical temperature signal and the second electrical temperature signal, and an ADC configured to convert the differential electrical temperature signal into digital temperature information.

The electrical temperature signal generator may be configured to input a current different from a current inputted into a transistor Q1 of the BJT into a transistor Q2 of the BJT connected to a circuit from which the first electrical temperature signal is outputted. The transistor Q1 of the BJT may be connected to a circuit from which the first electrical temperature signal is outputted.

In the electrical temperature signal generator, a magnitude of a transistor Q2 of the BJT connected to a circuit from which the first electrical temperature signal is outputted may be different from a magnitude of a transistor Q1 of the BJT connected to a circuit from which the first electrical temperature signal is outputted.

In the electrical temperature signal generator, a magnitude of a transistor Q2 of the BJT connected to a circuit from which the first electrical temperature signal is outputted may be different from a magnitude of a transistor Q1 of the BJT connected to a circuit from which the first electrical temperature signal is outputted. The electrical temperature signal generator may be configured to input, into the transistor Q2 of the BJT, a current different from a current inputted into the transistor Q1 of the BJT.

The temperature sensor may further include a switch configured to select one of the first electrical temperature signal and the second electrical temperature signal, and output the selected electrical temperature signal as a reference electrical temperature. The ADC may be configured to perform analog-to-digital conversion on the differential electrical temperature signal using the reference electrical temperature as a reference signal.

The first electrical temperature signal and the second electrical temperature signal may be analog signals including a CTAT characteristic having a negative (−) coefficient with respect to temperature. The differential electrical temperature signal may be an analog signal including a proportional to absolute temperature (PTAT) characteristic having a positive (+) coefficient with respect to temperature.

According to still another aspect, there is provided a temperature sensor including an electrical temperature signal generator configured to generate a first electrical temperature signal with a voltage that decreases according to an increase in temperature, and a second electrical temperature signal with a voltage that decreases according to an increase in temperature, the voltage with a slope different from a slope of the voltage of the first electrical temperature signal, using a self-biasing circuit and a BJT, a differential signal generator configured to generate a differential electrical temperature signal between the first electrical temperature signal and the second electrical temperature signal, and an ADC configured to convert the differential electrical temperature signal into digital temperature information.

The self-biasing circuit may include a transistor M3, a transistor M4, a transistor Q3, a transistor Q4, and an operational amplifier and may be configured to input a biasing current different from a biasing current inputted into a transistor Q1 of the BJT into a transistor Q2 of the BJT connected to a circuit from which the first electrical temperature signal is outputted. The transistor Q1 of the BJT may be connected to a circuit from which the first electrical temperature signal is outputted.

The first electrical temperature signal and the second electrical temperature signal may be analog signals including a CTAT characteristic having a negative (−) coefficient with respect to temperature. The differential electrical temperature signal may be an analog signal including a PTAT characteristic having a positive (+) coefficient with respect to temperature.

According to still another aspect, there is provided a method of operating a temperature sensor, the method including generating a first electrical temperature signal that changes according to temperature, and a second electrical temperature signal that changes according to the temperature at a different rate from that of the first electrical temperature signal, generating a differential electrical temperature signal between the first electrical temperature signal and the second electrical temperature signal, selecting, as a reference electrical temperature signal, one of the first electrical temperature signal and the second electrical temperature signal, and converting the differential electrical temperature signal into digital temperature information using the reference electrical temperature signal as a reference signal.

The method may further include outputting a gain so that a sum of the first electrical temperature signal or the second electrical temperature signal and the differential electrical temperature has a predetermined value with respect to a change in temperature.

Additional aspects of example embodiments will be set forth in part in the description which follows and, in part, will be apparent from the description, or may be learned by practice of the disclosure.

According to example embodiments, it is possible to simplify a structure of a temperature sensor by converting a differential electrical temperature signal into digital temperature information using, as a reference signal, one of a first electrical temperature signal and a second electrical temperature signal outputted by an electrical temperature signal generator without using an additional circuit for generating a signal having a predetermined value with respect to a change in temperature.

In addition, according to example embodiments, it is possible to reduce a semiconductor area for implementing a temperature sensor by simplifying a structure using one of a first electrical temperature signal and a second electrical temperature signal as a reference signal for converting a differential electrical temperature signal into digital temperature information.

In addition, according to example embodiments, it is possible to reduce power required for driving a temperature sensor by simplifying a structure using one of a first electrical temperature signal and a second electrical temperature signal as a reference signal for converting a differential electrical temperature signal into digital temperature information.

BRIEF DESCRIPTION OF THE DRAWINGS

These and/or other aspects, characteristics, and advantages of the invention will become apparent and more readily appreciated from the following description of example embodiments, taken in conjunction with the accompanying drawings of which.

DETAILED DESCRIPTION

Figure 1:
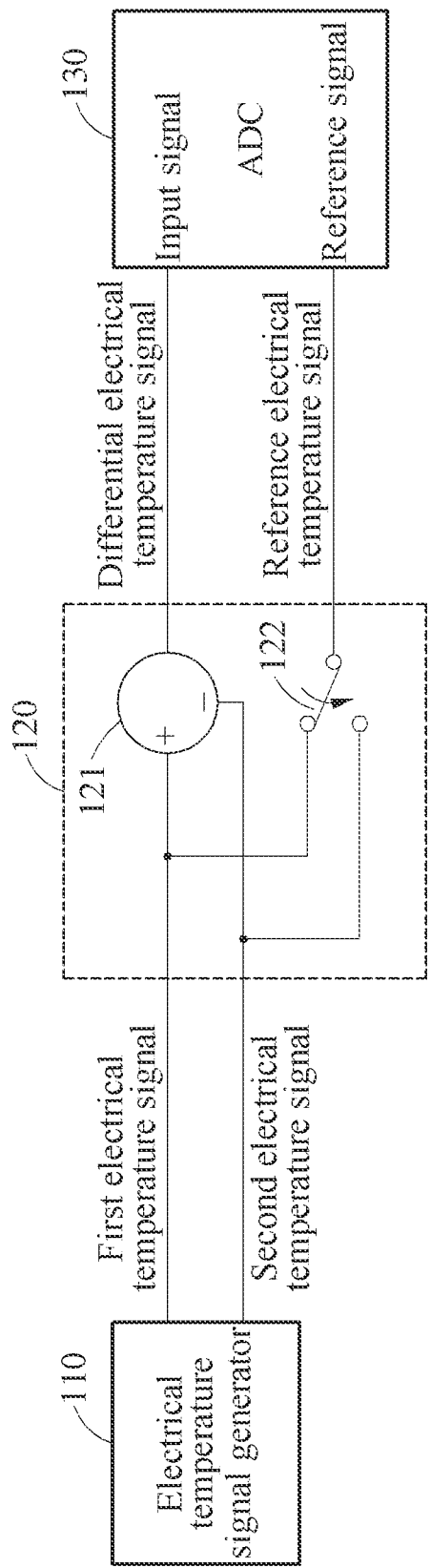
FIG. 1 is a diagram illustrating a temperature sensor according to a first example embodiment.

Hereinafter, example embodiments will be described in detail with reference to the accompanying drawings. Various modifications may be made to the example embodiments. The example embodiments are not construed as being limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated characteristics, integers, steps, operations, elements, components or a combination thereof, but do not preclude the presence or addition of one or more other characteristics, integers, steps, operations, elements, components, and/or groups thereof.

In addition, when describing the example embodiments with reference to the accompanying drawings, like reference numerals refer to like components and a repeated description related thereto will be omitted. When describing the example embodiments, detailed description of well-known related structures or functions will be omitted when it is deemed that such description will cause ambiguous interpretation of the example embodiments.

Hereinafter, embodiments of the present invention will be described in detail with reference to the accompanying drawings.

FIG. 1 is a diagram illustrating a temperature sensor according to a first example embodiment.

The temperature sensor according to the first example embodiment may include an electrical temperature signal generator 110, an electrical temperature signal processor 120, and an ADC 130, as illustrated in FIG. 1

The electrical temperature signal generator 110 may generate and output a first electrical temperature signal that changes according to temperature and a second electrical temperature signal that changes according to temperature at a different rate from that of the first electrical temperature signal. In this case, the first and second electrical temperature signals may be analog signals each having magnitude information.

The electrical temperature signal processor 120 may include a differential signal generator 121 and a switch 122, as illustrated in FIG. 1.

The differential signal generator 121 may generate and output a differential electrical temperature signal between the first electrical temperature signal and the second electrical temperature signal.

The switch 122 may select one of the first electrical temperature signal and the second electrical temperature signal, and output the selected electrical temperature signal as a reference electrical temperature signal.

The ADC 130 may convert the differential electrical temperature signal into digital temperature information, and output the digital temperature information. In this case, the ADC 130 may perform analog-to-digital conversion on the differential electrical temperature signal using the reference electrical temperature signal outputted by the switch 122 as a reference signal.

In addition, when the first electrical temperature signal and the second electrical temperature signal include a PTAT characteristic having a positive (+) coefficient with respect to temperature, the differential electrical temperature signal may include a CTAT characteristic having a negative (−) coefficient with respect to temperature.

In addition, when the first electrical temperature signal and the second electrical temperature signal include the CTAT characteristic having the negative (−) coefficient with respect to temperature, the differential electrical temperature signal may include the PTAT characteristic having the positive (+) coefficient with respect to temperature.

The temperature sensor according to an example embodiment may convert the differential electrical temperature signal into the digital temperature information using, as the reference signal, one of the first electrical temperature signal and the second electrical temperature signal outputted by the electrical temperature signal generator without using an additional circuit for generating a signal having a predetermined value with respect to a change in temperature, thereby simplifying a structure of the temperature sensor.

In addition, the temperature sensor according to an example embodiment may simplify the structure using one of the first electrical temperature signal and the second electrical temperature signal as the reference signal for converting the differential electrical temperature signal into the digital temperature information, thereby reducing a semiconductor area for implementing the temperature sensor.

In addition, the temperature sensor according to an example embodiment may simplify the structure using one of the first electrical temperature signal and the second electrical temperature signal as the reference signal for converting the differential electrical temperature signal into the digital temperature information, thereby reducing power required for driving the temperature sensor.

Figure 2:
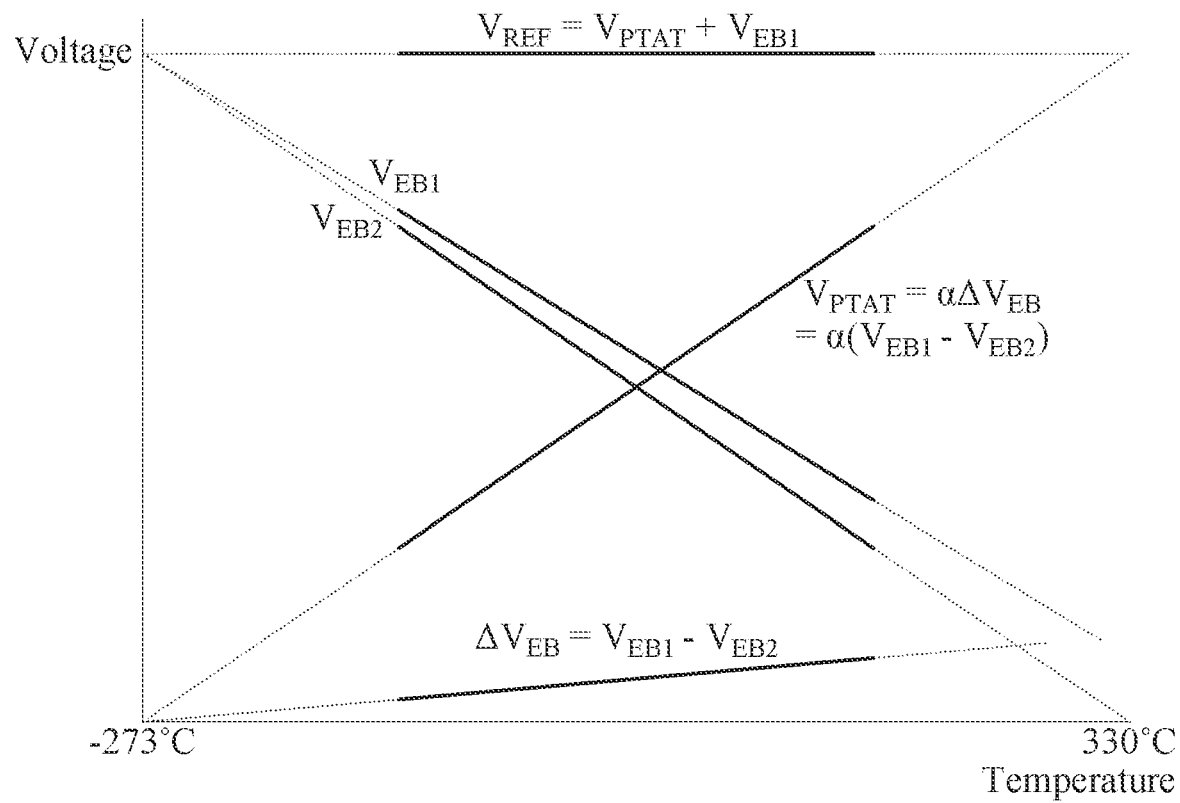
FIG. 2 is a diagram illustrating an operating principle of a temperature sensor according to the first example embodiment.

FIG. 2 is a diagram illustrating an operating principle of the temperature sensor according to the first example embodiment.

In FIG. 2, $V_{EB1}$ may be a first electrical temperature signal including a CTAT characteristic, and $V_{EB2}$ may be a second electrical temperature signal including a CTAT characteristic.

In this case, a differential electrical temperature signal outputted by the differential signal generator 121 may be $\Delta V_{EB}$. In addition, when the differential signal generator 121 provides a gain α, the differential electrical temperature signal may be $V_{PTAT} = \alpha \Delta V_{EB}$.

The ADC 130 may perform analog-to-digital conversion on an input signal by setting a signal as a reference signal. In this case, when a $V_{PTAT} (=\alpha \Delta V_{EB})$ signal having a PTAT characteristic and $V_{EB1}$ having the CTAT characteristic balance each other with respect to a change in temperature by the gain α of the differential signal generator 121, $V_{REF}$ $(=V_{PTAT}+V_{EB1})$, which is a sum of the two signals, may have a predetermined value with respect to temperature.

Accordingly, when $V_{REF}$ $(=V_{PTAT}+V_{EB1})$ is used as a reference signal of the ADC 130, and $V_{PTAT}(=\alpha \Delta V_{EB})$ is used as an input signal of the ADC 130, the ADC 130 may have the PTAT characteristic with respect to temperature, and output digital temperature information μ having a value of 0 to 1 with respect to a temperature range of about 600° C. (−273° C. to +330° C.). For example, the digital temperature information μ may be represented by Equation 1.

$$\mu = \alpha \Delta V_{EB}/(\alpha \Delta V_{EB}+V_{EB1}) \quad \text{[Equation 1]}$$

In addition, the temperature sensor may display a temperature determined according to Equation 2, or provide the temperature to a user or another apparatus.

$$\text{Temperature} = A \cdot \mu + B \quad \text{[Equation 2]}$$

In this case, A and B may be preset temperatures. For example, A may be 600° C., and B may be −273° C.

In addition, when the temperature sensor uses one of $V_{EB1}$ or $V_{EB2}$ as the reference signal of the ADC 130 as illustrated in FIG. 1, the ADC 130 may convert the differential electrical temperature signal into digital temperature information using an analog-to-digital conversion value K.

$$K = \alpha \Delta V_{EB}/V_{EB1} \quad \text{[Equation 3]}$$

Accordingly, in the ADC 130 of the temperature sensor according to the first example embodiment, not only the input signal may change according to temperature, but also the reference signal may be a signal that changes according to temperature. Accordingly, the analog-to-digital conversion value K of the ADC 130 may not be a linear value according to temperature. Accordingly, the temperature sensor may display a temperature determined according to Equation 4 determined by substituting Equation 3 into Equations 1 and 2, or provide the temperature to a user or another apparatus.

$$\text{Temperature} = A \cdot \mu + B$$

$$\text{Temperature} = A \cdot (\alpha \Delta V_{EB}/(\alpha \Delta V_{EB}+V_{EB1})) + B$$

$$\text{Temperature} = A \cdot (K/(K+1)) + B \quad \text{[Equation 4]}$$

Figure 3:
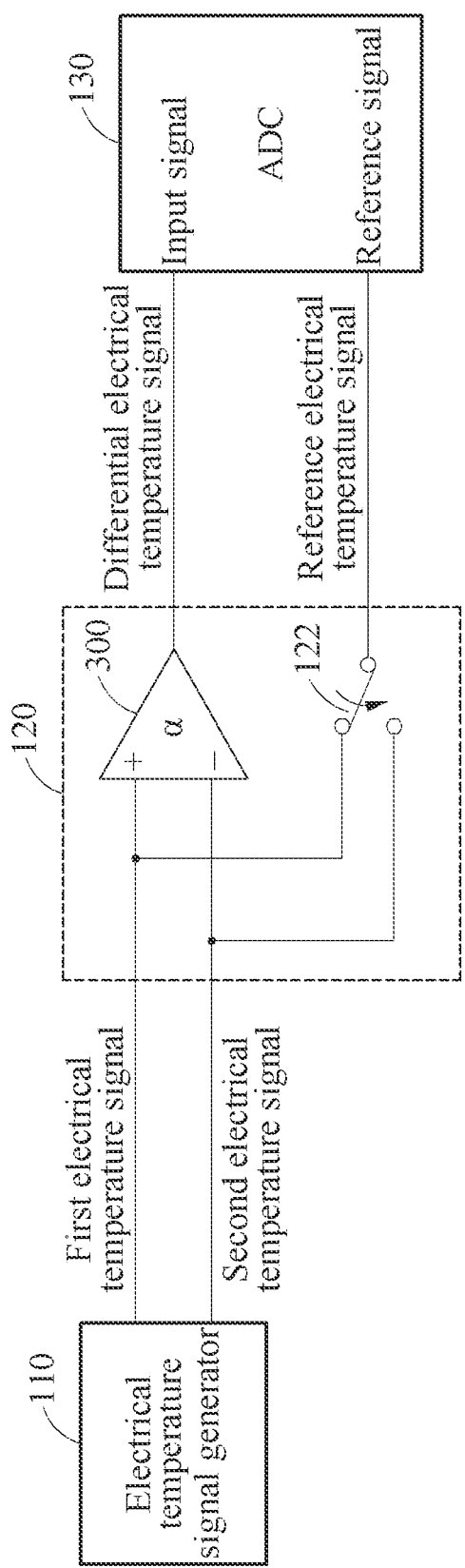
FIG. 3 is a diagram illustrating a temperature sensor according to a second example embodiment.

FIG. 3 is a diagram illustrating a temperature sensor according to a second example embodiment.

The temperature sensor according to the second example embodiment may include the electrical temperature signal generator 110, the electrical temperature signal processor 120, and the ADC 130, as illustrated in FIG. 2.

The electrical temperature signal generator 110 may generate and output a first electrical temperature signal that changes according to temperature and a second electrical temperature signal that changes according to temperature at a different rate from that of the first electrical temperature signal. In this case, the first and second electrical temperature signals may be analog signals each having magnitude information.

The electrical temperature signal processor 120 may include a differential signal gain generator 300 and the switch 122, as illustrated in FIG. 2.

The differential signal gain generator 300 may generate a differential electrical temperature signal between the first electrical temperature signal and the second electrical temperature signal. In addition, the differential signal gain generator 300 may output, to the ADC 130, a gain to allow a sum of a reference electrical temperature signal and a differential electrical temperature to have a predetermined value with respect to a change in temperature.

The switch 122 may select one of the first electrical temperature signal and the second electrical temperature signal, and output the selected electrical temperature signal as a reference electrical temperature signal.

The ADC 130 may convert the differential electrical temperature signal into digital temperature information using, as a reference signal, the reference electrical temperature signal and a sum of the differential electrical temperature and the gain.

Figure 4:
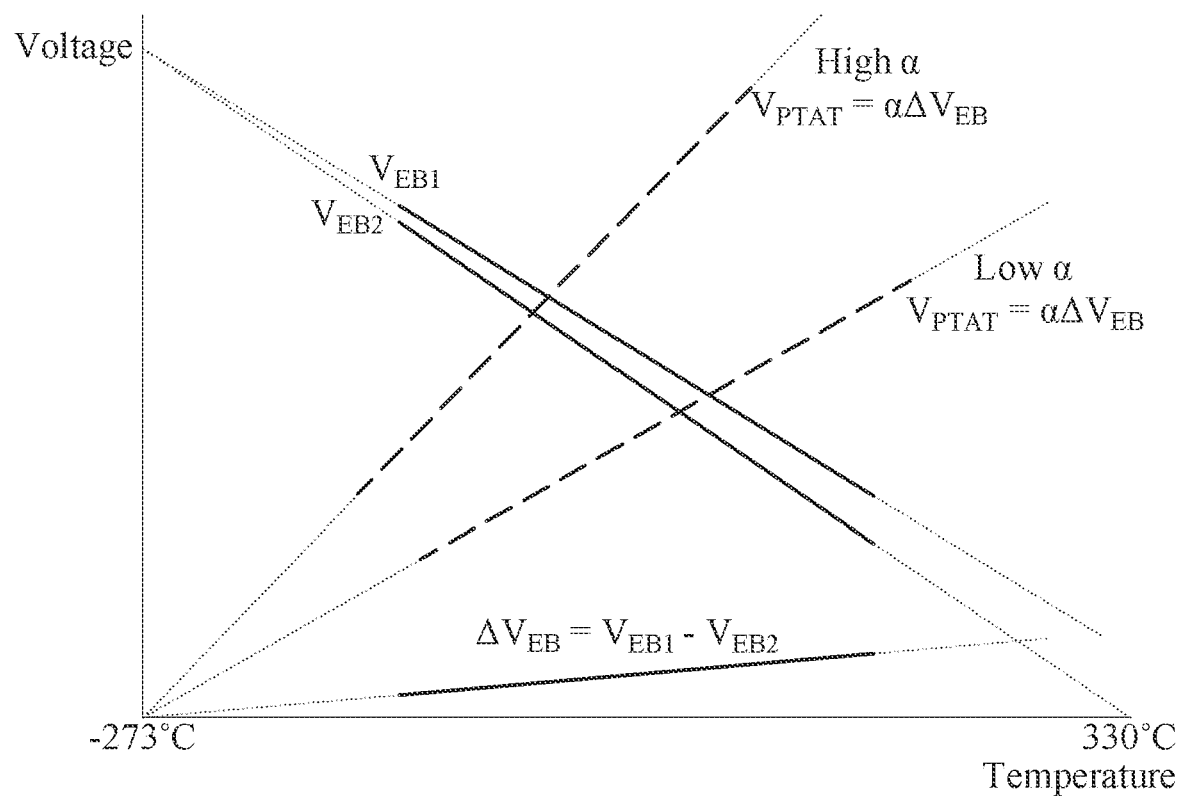
FIG. 4 is a diagram illustrating an operating principle of a temperature sensor according to the second example embodiment.

FIG. 4 is a diagram illustrating an operating principle of the temperature sensor according to the second example embodiment.

The differential signal gain generator 300 may determine an outputted gain as a value between a high gain (high α) and a low gain (low α), thereby using a wider dynamic range of the ADC 130.

Figure 5:
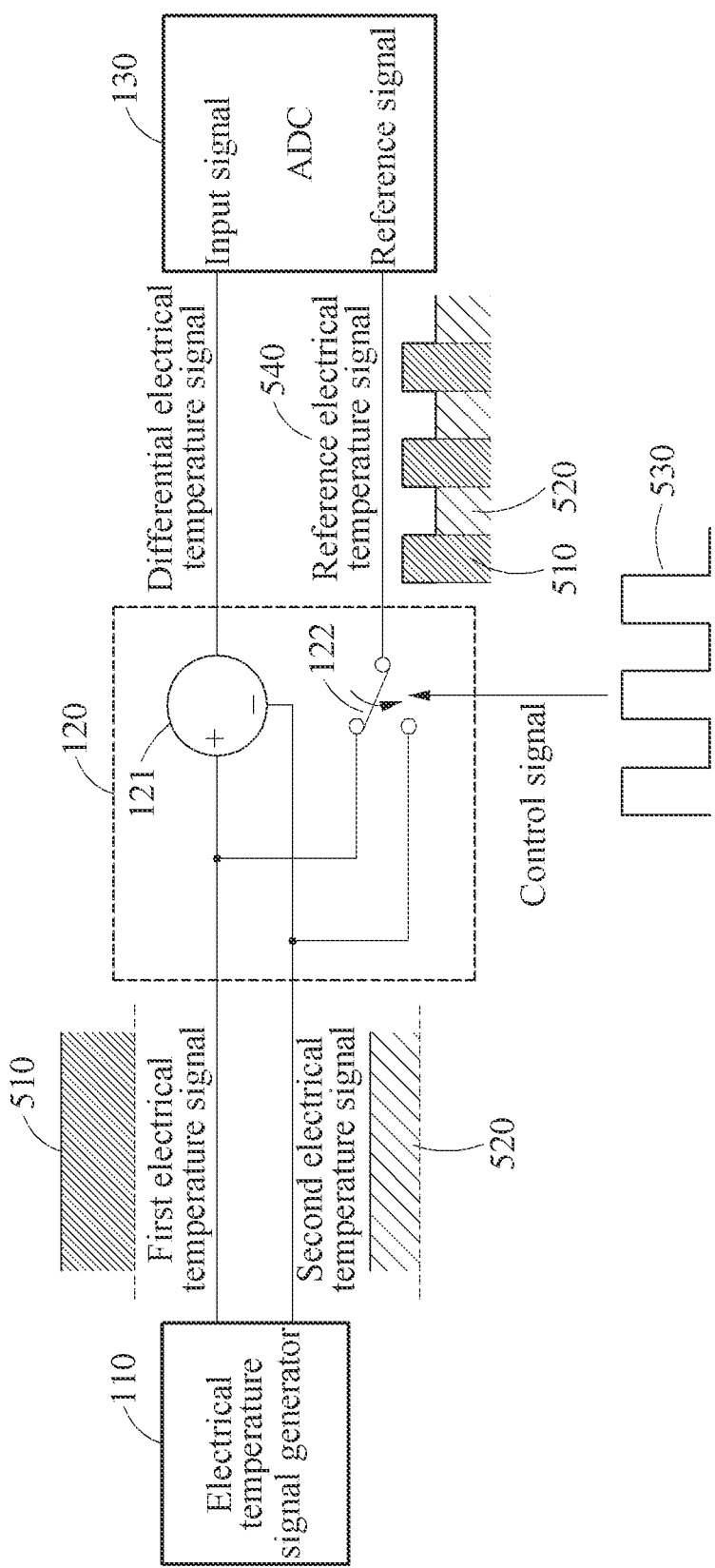
FIG. 5 is a diagram illustrating a temperature sensor according to a third example embodiment.

FIG. 5 is a diagram illustrating a temperature sensor according to a third example embodiment.

The temperature sensor according to the third example embodiment may include the electrical temperature signal generator 110, the electrical temperature signal processor 120, and the ADC 130, as illustrated in FIG. 3. At this time, the electrical temperature signal generator 110, the differential signal generator 121 of the electrical temperature signal processor 120, and the ADC 130 may be the same as those of the temperature sensor illustrated in FIG. 1, and thus a detailed description thereof is omitted.

In this case, the switch 122 of the electrical temperature signal processor 120 may alternatingly select a first electrical temperature signal 510 and a second electrical temperature signal 520 so that a reference electrical temperature signal has an average value of the first electrical temperature signal 510 and the second electrical temperature signal 520.

Specifically, the switch 122 may receive a control signal 530 for changing selection at predetermined intervals. In addition, the reference electrical temperature signal 540 output from the switch 122 may be a signal in which the first electrical temperature signal 510 and the second electrical temperature signal 520 are alternated at a predetermined time interval as illustrated in FIG. 5.

Figure 6:
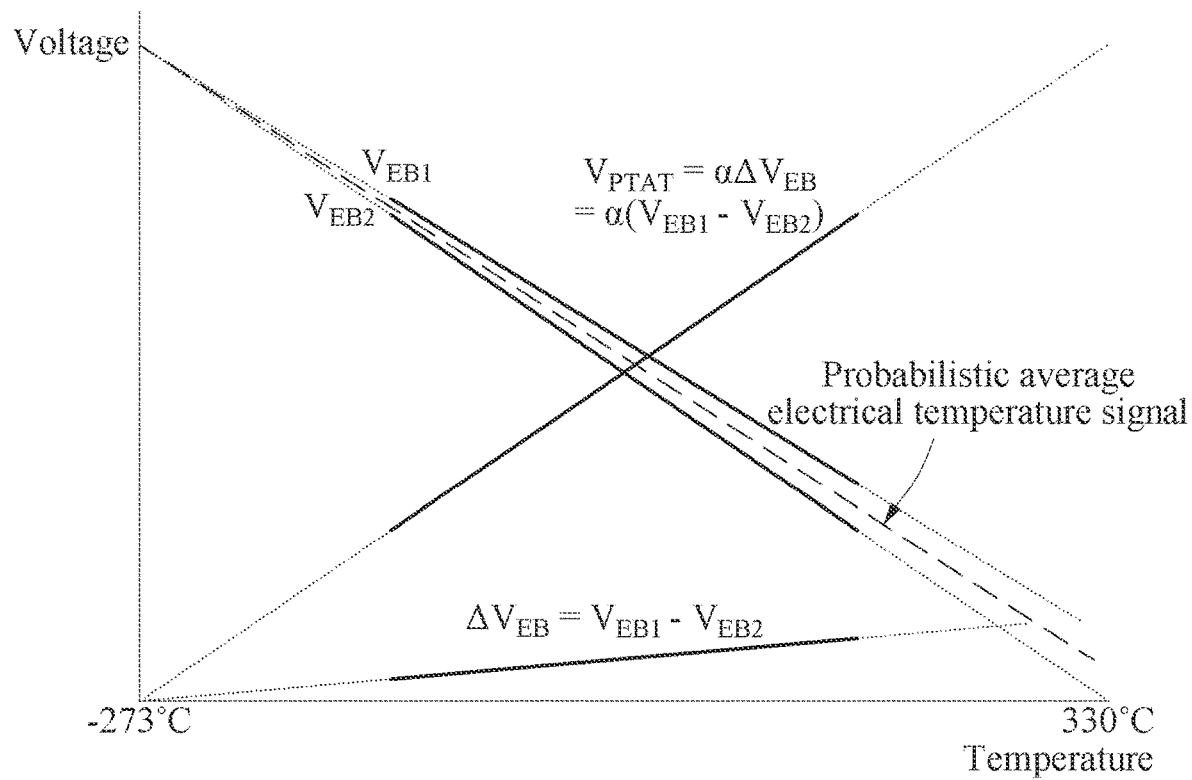
FIG. 6 is a diagram illustrating an operating principle of a temperature sensor according to the third example embodiment.

In this case, a reference electrical temperature signal 540 may be in a state in which the first electrical temperature signal 510 and the second electrical temperature signal 520 are alternated at a predetermined time interval, and thus the ADC 130 may receive the reference electrical temperature signal 540 as a signal having an average value of the first electrical temperature signal 510 and the second electrical temperature signal 520, as illustrated in FIG. 6.

Figure 7:
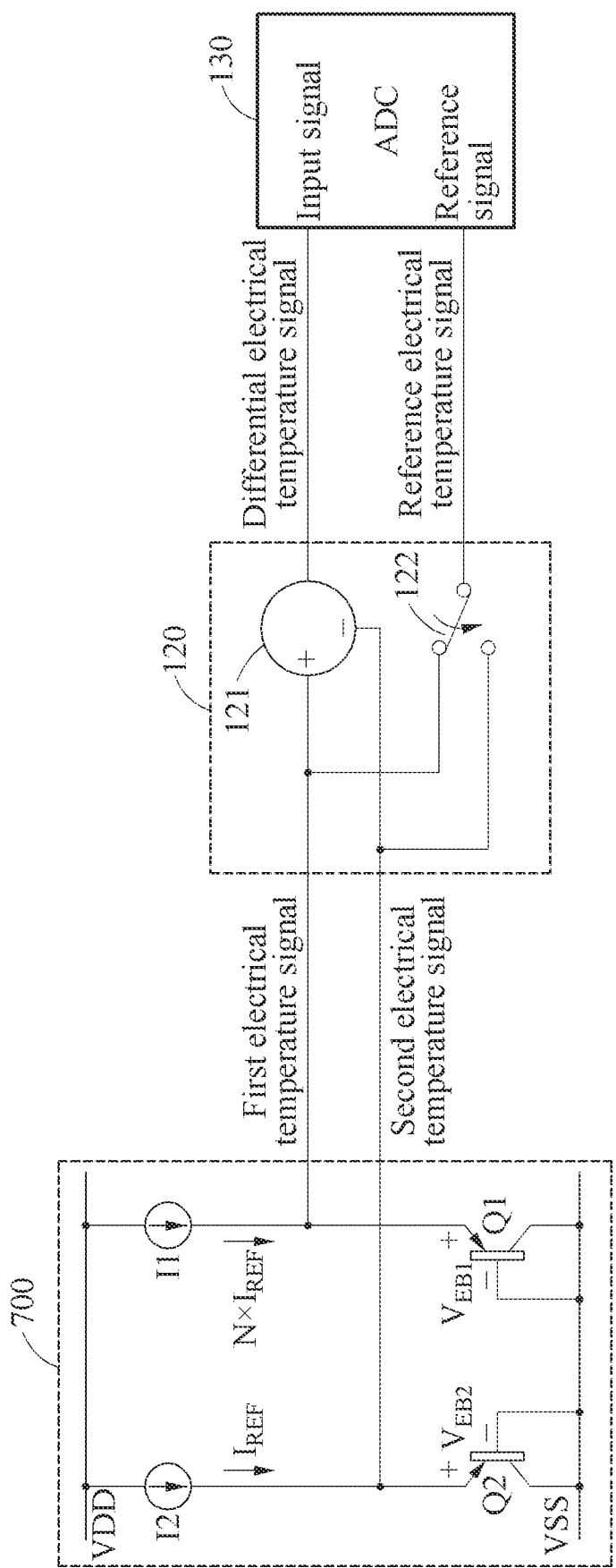
FIG. 7 is a diagram illustrating a temperature sensor according to a fourth example embodiment.

FIG. 7 is a diagram illustrating a temperature sensor according to a fourth example embodiment.

The temperature sensor according to the fourth example embodiment may include an electrical temperature signal generator 700, the electrical temperature signal processor 120, and the ADC 130, as illustrated in FIG. 4. In this case, the electrical temperature signal processor 120 and the ADC 130 may be the same as those of the temperature sensor illustrated in FIG. 1, and thus a detailed description thereof is omitted.

The electrical temperature signal generator 700 may generate a first electrical temperature signal with a voltage that decreases according to an increase in temperature, and a second electrical temperature signal with a voltage that decreases according to an increase in temperature, the voltage with a slope different from a slope of the voltage of the first electrical temperature signal, using a BJT. In the BJT, a voltage $V_{EB}$ between emitter-bases, which is an inherent characteristic of an apparatus, may be 1.25 V at absolute temperature of 0 K. In addition, $V_{EB}$ may have a CTAT characteristic that decreases as the absolute temperature increases. In general, for an increase of 1 K in the absolute temperature, $V_{EB}$ of the BJT may decrease by about 2 mV.

In this case, in the electrical temperature signal generator 700, a transistor Q1 of the BJT may be connected to a circuit from which the first electrical temperature signal is outputted. In addition, the electrical temperature signal generator 700 may input a current different from a current inputted into the transistor Q1 of the BJT into a transistor Q2 of the BJT connected to a circuit from which the second electrical temperature signal is outputted, thereby allowing the first electrical temperature signal and the second electrical temperature signal that are $V_{EB}$ voltages having a CTAT characteristic to have different slopes for temperature. In this case, the differential electrical temperature signal may include a PTAT characteristic having a positive (+) coefficient with respect to temperature.

For example, the electrical temperature signal generator 700 may input an inputted current $I_{REF}$ into the transistor Q1 of the BJT, and input $N \times I_{REF}$ into the transistor Q2 of the BJT.

Figure 8:
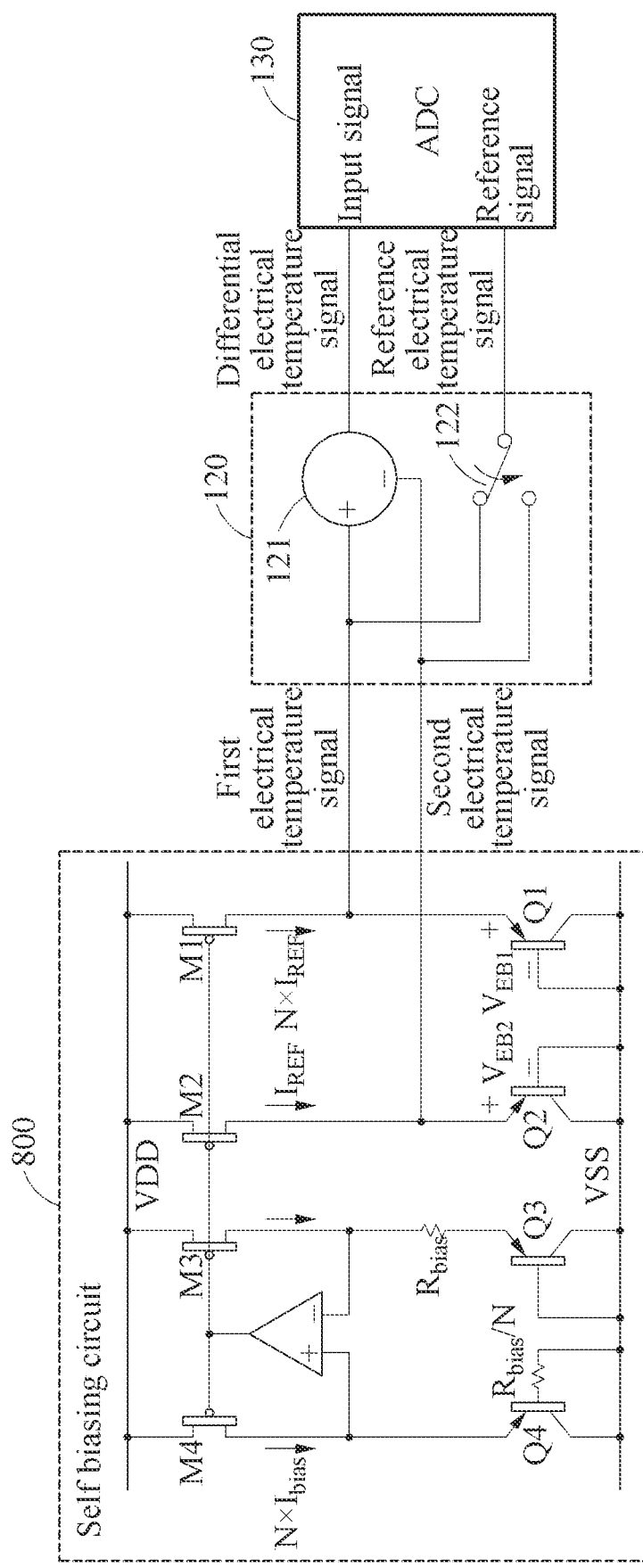
FIG. 8 is a diagram illustrating a temperature sensor according to a fifth example embodiment.

FIG. 8 is a diagram illustrating a temperature sensor according to a fifth example embodiment.

The temperature sensor according to the fifth example embodiment may include an electrical temperature signal generator 800, the electrical temperature signal processor 120, and the ADC 130, as illustrated in FIG. 8. In this case, the electrical temperature signal processor 120 and the ADC 130 may be the same as those of the temperature sensor illustrated in FIG. 1, and thus a detailed description thereof is omitted.

The electrical temperature signal generator 800 may generate a first electrical temperature signal with a voltage that decreases according to an increase in temperature, and a second electrical temperature signal with a voltage that decreases according to an increase in temperature, the voltage with a slope different from a slope of the voltage of the first electrical temperature signal, using a self-biasing circuit and a BJT.

In this case, the self-biasing circuit may include a transistor M3, a transistor M4, a transistor Q3, a transistor Q4, and an operational amplifier. In addition, the self-biasing circuit may input a biasing current different from a biasing current inputted into a transistor Q1 of the BJT into a transistor Q2 of the BJT connected to a circuit from which the first electrical temperature signal is outputted. In this case, the transistor Q1 of the BJT may be connected to a circuit from which the first electrical temperature signal is outputted. In addition, the first electrical temperature signal and the second electrical temperature signal may be analog signals including a CTAT characteristic having a negative (−) coefficient with respect to temperature, and the differential electrical temperature signal may include a PTAT characteristic having a positive (+) coefficient with respect to temperature.

Figure 9:
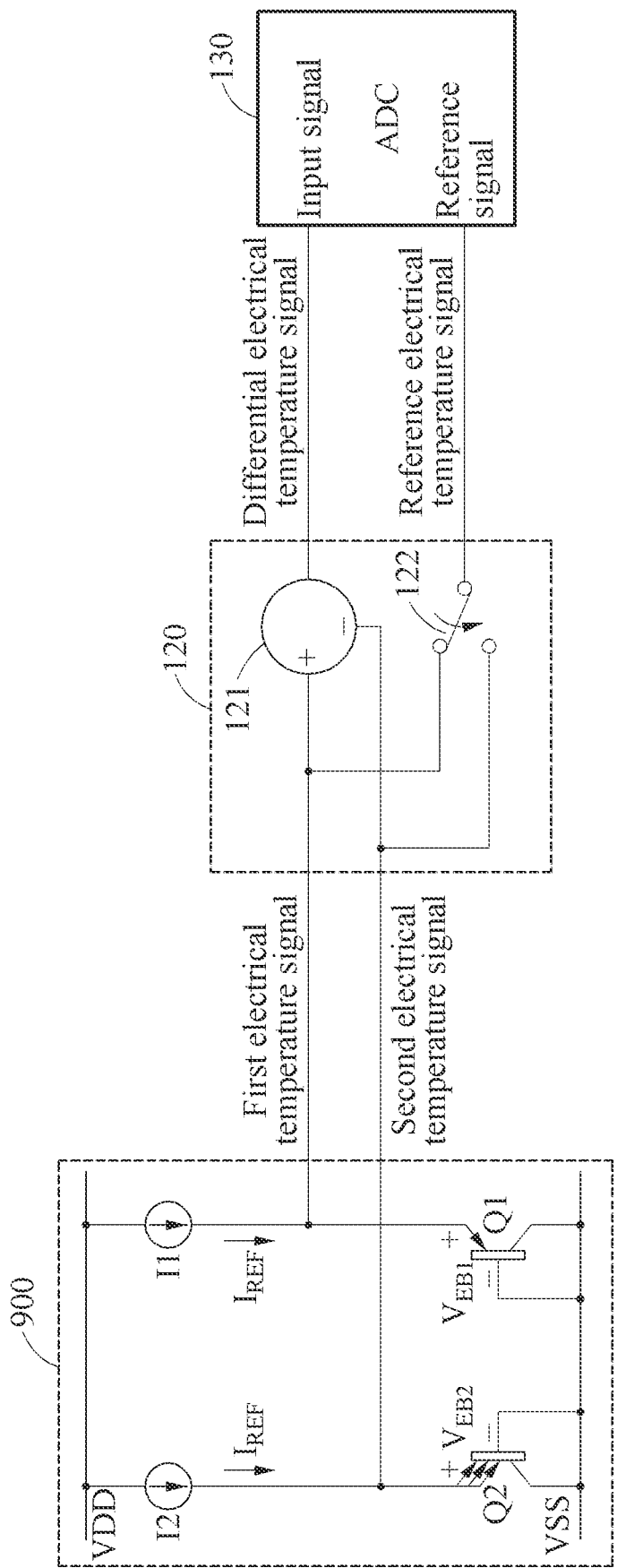
FIG. 9 is a diagram illustrating a temperature sensor according to a sixth example embodiment.

FIG. 9 is a diagram illustrating a temperature sensor according to a sixth example embodiment.

The temperature sensor according to the fifth example embodiment may include an electrical temperature signal generator 900, the electrical temperature signal processor 120, and the ADC 130, as illustrated in FIG. 9. In this case, the electrical temperature signal processor 120 and the ADC 130 may be the same as those of the temperature sensor illustrated in FIG. 1, and thus a detailed description thereof is omitted.

In the electrical temperature signal generator 900, a magnitude of a transistor Q2 of a BJT connected to a circuit from which the second electrical temperature signal is outputted may be different from a magnitude of a transistor Q1 of the BJT connected to a circuit from which the first electrical temperature signal is outputted.

That is, the temperature sensor according to the fifth example embodiment may allow the magnitudes of the the transistor Q1 and the transistor Q2 of the BJT to be different from each other, thereby generating the second electrical temperature signal that changes according to temperature at a different rate from that of the first electrical temperature signal.

Figure 10:
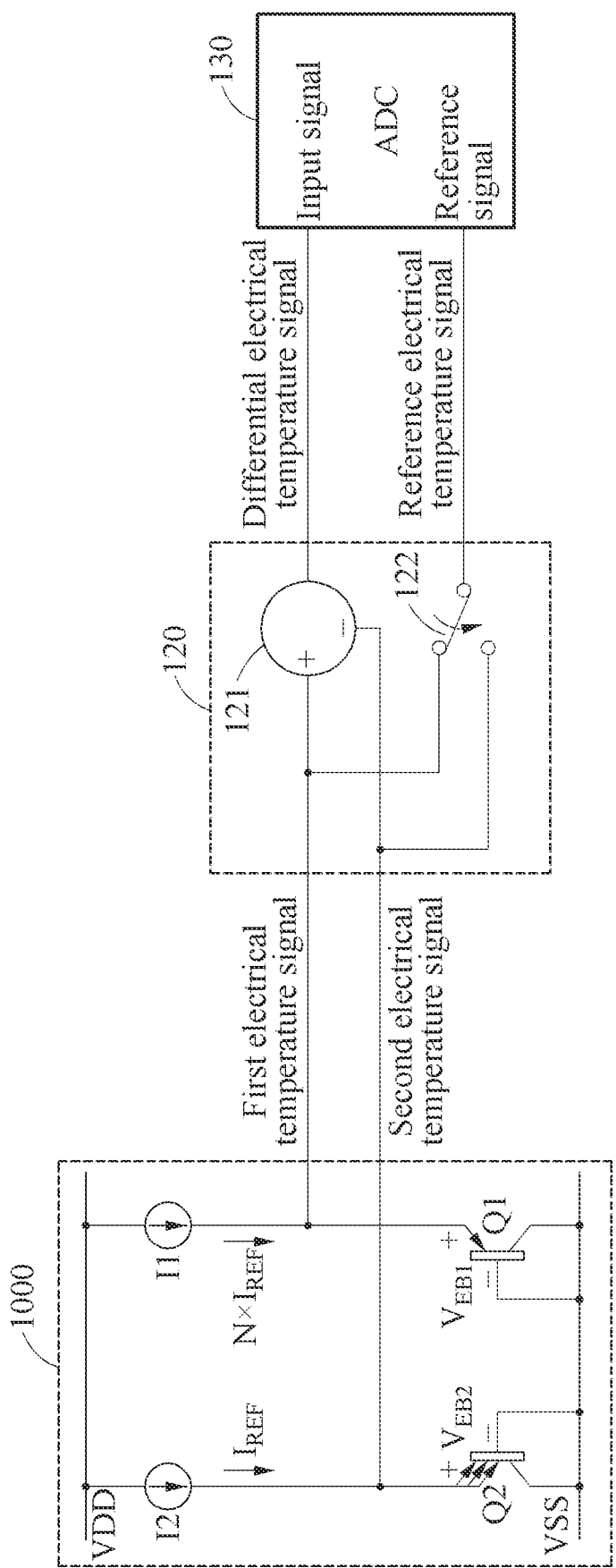
FIG. 10 is a diagram illustrating a temperature sensor according to a seventh example embodiment.

FIG. 10 is a diagram illustrating a temperature sensor according to a seventh example embodiment.

The temperature sensor according to the seventh example embodiment may include an electrical temperature signal generator 1000, the electrical temperature signal processor 120, and the ADC 130, as illustrated in FIG. 10. In this case, the electrical temperature signal processor 120 and the ADC 130 may be the same as those of the temperature sensor illustrated in FIG. 1, and thus a detailed description thereof is omitted.

The electrical temperature signal generator 1000 may be a component obtained by increasing a difference in a change rate according to a change in temperature between a first electrical temperature signal and a second electrical temperature signal by applying structures of the electrical temperature signal generator 700 and the electrical temperature signal generator 800 in a combined manner.

Specifically, in the electrical temperature signal generator 1000, a magnitude of a transistor Q2 of a BJT connected to a circuit from which the second electrical temperature signal is outputted may be different from a magnitude of a transistor Q1 of the BJT connected to a circuit from which the first electrical temperature signal is outputted. In addition, the electrical temperature signal generator 1000 may input, into the transistor Q2 of the BJT, a current different from a current inputted into the transistor Q1 of the BJT. For example, the electrical temperature signal generator 1000 may input an inputted current $I_{REF}$ into the transistor Q1 of the BJT, and input $N \times I_{REF}$ into the transistor Q2 of the BJT.

Figure 11:
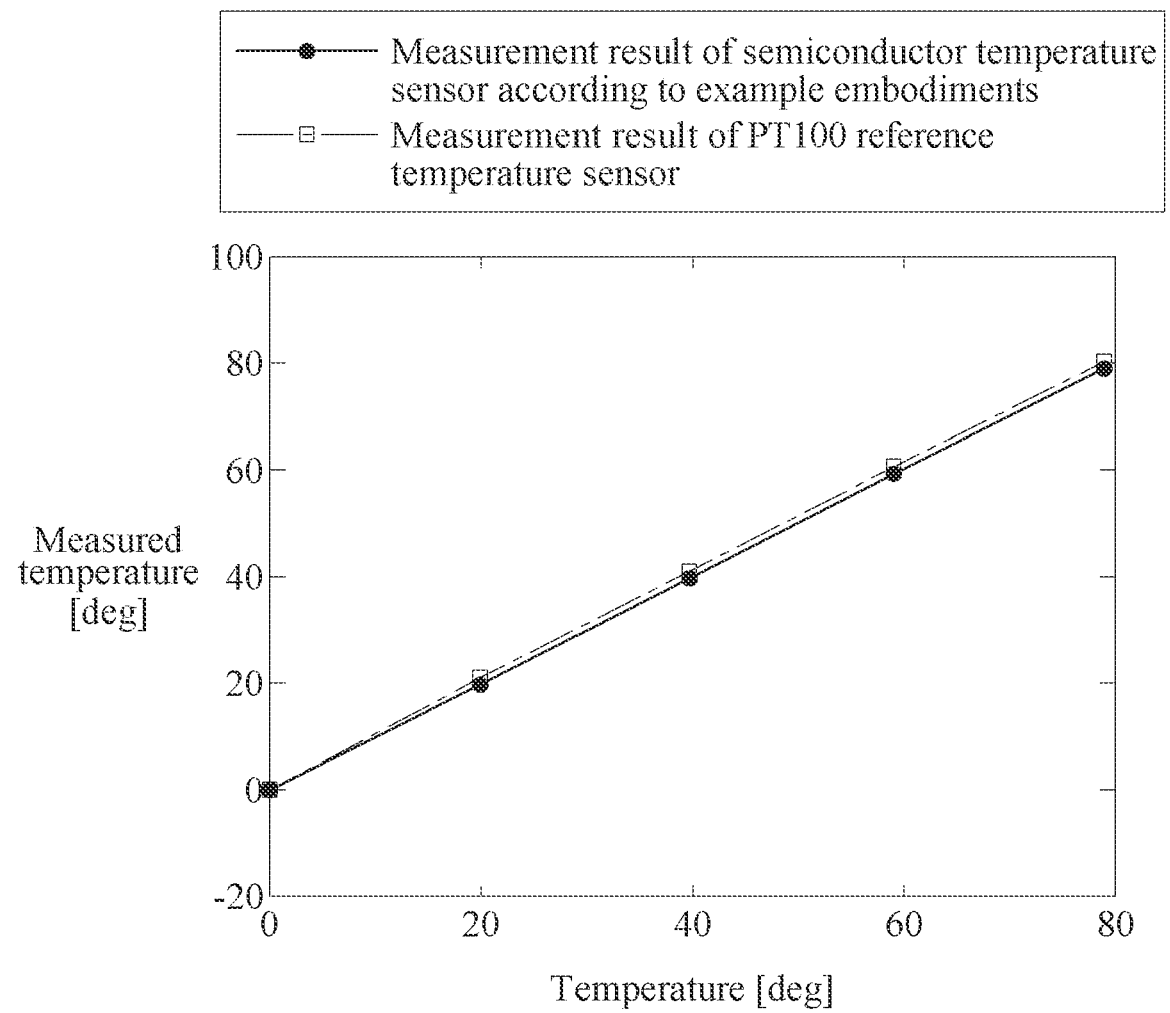
FIG. 11 is an example of a result of measuring a temperature characteristic of a temperature sensor according to an example embodiment.

FIG. 11 is an example of a result of measuring a temperature characteristic of a temperature sensor according to an example embodiment.

When comparing the result of measuring the temperature characteristic of the temperature sensor according to an example embodiment to a result of measuring a temperature characteristic of a generally used PT-100 reference temperature sensor, the temperature sensor may exhibit the temperature characteristic that is almost identical to that of the PT-100 reference temperature sensor with respect to a temperature range of 0 to 80° C., as illustrated in FIG. 11.

Figure 12:
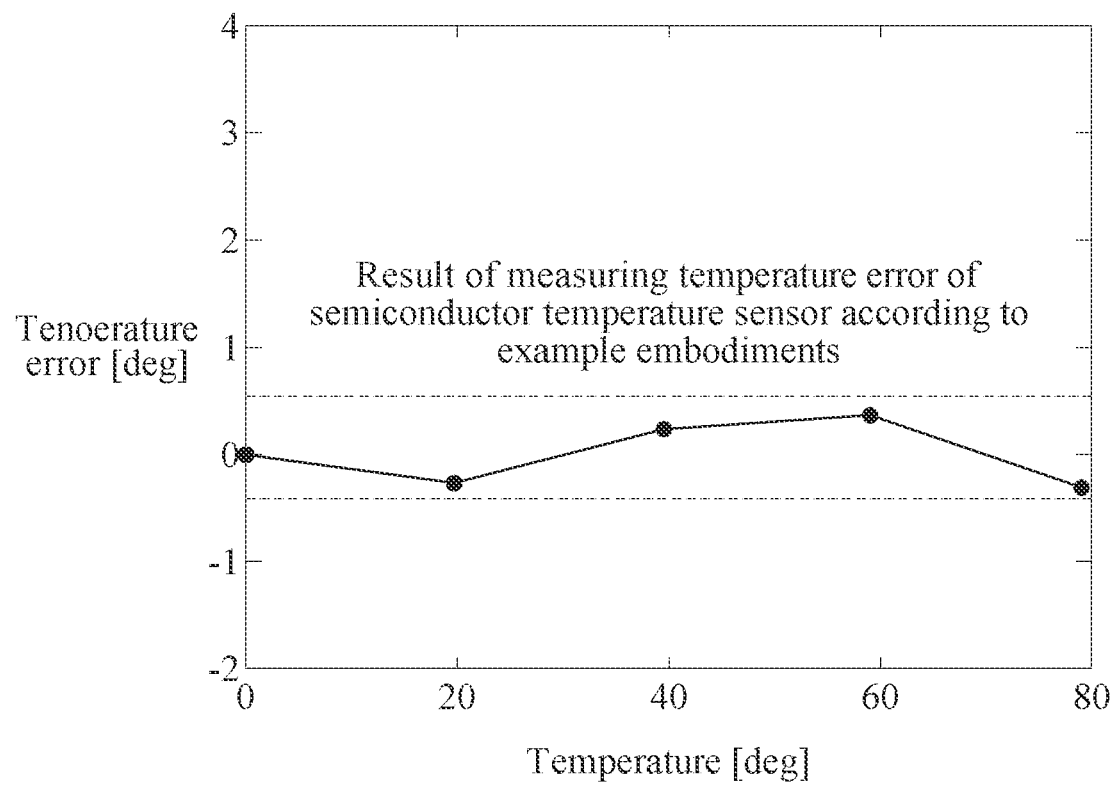
FIG. 12 is an example of a result of measuring a temperature error of a temperature sensor according to an example embodiment.

FIG. 12 is an example of a result of measuring a temperature error of a temperature sensor according to an example embodiment.

As illustrated in FIG. 12, the result of measuring the temperature error of the temperature sensor according to an example embodiment may exhibit a temperature measurement error performance of ±0.4° C. or less with respect to a temperature range of 0 to 80° C. In addition, an RMS temperature error of the temperature sensor according to an example embodiment may be about 0.27° C.

According to example embodiments, it is possible to simplify a structure of a temperature sensor by converting a differential electrical temperature signal into digital temperature information using, as a reference signal, one of a first electrical temperature signal and a second electrical temperature signal outputted by an electrical temperature signal generator without using an additional circuit for generating a signal having a predetermined value with respect to a change in temperature.

In addition, according to example embodiments, it is possible to reduce a semiconductor area for implementing a temperature sensor by simplifying a structure using one of a first electrical temperature signal and a second electrical temperature signal as a reference signal for converting a differential electrical temperature signal into digital temperature information.

In addition, according to example embodiments, it is possible to reduce power required for driving a temperature sensor by simplifying a structure using one of a first electrical temperature signal and a second electrical temperature signal as a reference signal for converting a differential electrical temperature signal into digital temperature information.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The temperature sensor and the method of operating the temperature sensor according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A temperature sensor comprising:
an electrical temperature signal generator configured to generate a first electrical temperature signal that changes according to temperature and a second electrical temperature signal that changes according to temperature at a different rate from that of the first electrical temperature signal;
a switch configured to select one of the first electrical temperature signal and the second electrical temperature signal, and output the selected electrical temperature signal as a reference electrical temperature signal;
a differential signal generator configured to generate a differential electrical temperature signal between the first electrical temperature signal and the second electrical temperature signal and output a gain so that a sum of the reference electrical temperature signal and the differential electrical temperature has a predetermined value with respect to a change in temperature; and
an analog-to-digital converter (ADC) configured to convert the differential electrical temperature signal into digital temperature information using the reference electrical temperature signal as a reference signal,
wherein the switch receives a control signal for changing selection at predetermined intervals and changes selection from the first electric temperature signal to the second electric temperature signal, or from the second electric temperature signal to the first electric temperature signal, so that the reference electrical temperature signal received by the analog-to-digital converter has an average value of the first electrical temperature signal and the second electrical temperature signal.

2. The temperature sensor of claim 1, wherein the first electrical temperature signal and the second electrical temperature signal are analog signals including a proportional to absolute temperature (PTAT) characteristic having a positive (+) coefficient with respect to temperature, and
the differential electrical temperature signal is an analog signal including a complementary to absolute temperature (CTAT) characteristic having a negative (−) coefficient with respect to temperature.

3. The temperature sensor of claim 1, wherein the first electrical temperature signal and the second electrical temperature signal are analog signals including a CTAT characteristic having a negative (−) coefficient with respect to temperature, and
the differential electrical temperature signal is an analog signal including a PTAT characteristic having a positive (+) coefficient with respect to temperature.

4. A temperature sensor comprising:
an electrical temperature signal generator configured to generate a first electrical temperature signal with a voltage that decreases according to an increase in temperature, and a second electrical temperature signal with a voltage that decreases according to an increase in temperature, the voltage with a slope different from a slope of the voltage of the first electrical temperature signal, using a bipolar junction transistor (BJT);
a switch configured to select one of the first electrical temperature signal and the second electrical temperature signal, and output the selected electrical temperature signal as a reference electrical temperature signal;
a differential signal generator configured to generate a differential electrical temperature signal between the first electrical temperature signal and the second electrical temperature signal and output a gain so that a sum of the reference electrical temperature signal and the differential electrical temperature has a predetermined value with respect to a change in temperature; and
an analog-to-digital converter (ADC) configured to convert the differential electrical temperature signal into digital temperature information using the reference electrical temperature signal as a reference signal,
wherein the switch receives a control signal for changing selection at predetermined intervals and changes selection from the first electric temperature signal to the second electric temperature signal, or from the second electric temperature signal to the first electric temperature signal, so that the reference electrical temperature signal received by the analog-to-digital converter has an average value of the first electrical temperature signal and the second electrical temperature signal.

5. The temperature sensor of claim 4, wherein the electrical temperature signal generator is configured to input a current different from a current inputted into a transistor Q1 of the BJT into a transistor Q2 of the BJT connected to a circuit from which the second electrical temperature signal is outputted, and
the transistor Q1 of the BJT is connected to a circuit from which the first electrical temperature signal is outputted.

6. The temperature sensor of claim 4, wherein, in the electrical temperature signal generator, a magnitude of a transistor Q2 of the BJT connected to a circuit from which the second electrical temperature signal is outputted is different from a magnitude of a transistor Q1 of the BJT connected to a circuit from which the first electrical temperature signal is outputted.

7. The temperature sensor of claim 4, wherein, in the electrical temperature signal generator, a magnitude of a transistor Q2 of the BJT connected to a circuit from which the second electrical temperature signal is outputted is different from a magnitude of a transistor Q1 of the BJT connected to a circuit from which the first electrical temperature signal is outputted, and
the electrical temperature signal generator is configured to input, into the transistor Q2 of the BJT, a current different from a current inputted into the transistor Q1 of the BJT.

8. The temperature sensor of claim 4, further comprising:
a switch configured to select one of the first electrical temperature signal and the second electrical temperature signal, and output the selected electrical temperature signal as a reference electrical temperature,
wherein the ADC is configured to perform analog-to-digital conversion on the differential electrical temperature signal using the reference electrical temperature as a reference signal.

9. The temperature sensor of claim 4, wherein the first electrical temperature signal and the second electrical temperature signal are analog signals including a complementary to absolute temperature (CTAT) characteristic having a negative (−) coefficient with respect to temperature, and
the differential electrical temperature signal is an analog signal including a proportional to absolute temperature (PTAT) characteristic having a positive (+) coefficient with respect to temperature.

10. A temperature sensor comprising:
an electrical temperature signal generator configured to generate a first electrical temperature signal with a voltage that decreases according to an increase in temperature, and a second electrical temperature signal with a voltage that decreases according to an increase in temperature, the voltage with a slope different from a slope of the voltage of the first electrical temperature signal, using a self-biasing circuit and a bipolar junction transistor (BJT);

a switch configured to select one of the first electrical temperature signal and the second electrical temperature signal, and output the selected electrical temperature signal as a reference electrical temperature signal;

a differential signal generator configured to generate a differential electrical temperature signal between the first electrical temperature signal and the second electrical temperature signal and output a gain so that a sum of the reference electrical temperature signal and the differential electrical temperature has a predetermined value with respect to a change in temperature; and an analog-to-digital converter (ADC) configured to convert the differential electrical temperature signal into digital temperature information using the reference electrical temperature signal as a reference signal, wherein the switch receives a control signal for changing selection at predetermined intervals and changes selection from the first electric temperature signal to the second electric temperature signal, or from the second electric temperature signal to the first electric temperature signal, so that the reference electrical temperature signal received by the analog-to-digital converter has an average value of the first electrical temperature signal and the second electrical temperature signal.

11. The temperature sensor of claim 10, wherein the self-biasing circuit comprises a transistor M3, a transistor M4, a transistor Q3, a transistor Q4, and an operational amplifier, and is configured to input a biasing current different from a biasing current inputted into a transistor Q1 of the BJT into a transistor Q2 of the BJT connected to a circuit from which the second electrical temperature signal is outputted, and the transistor Q1 of the BJT is connected to a circuit from which the first electrical temperature signal is outputted.

12. The temperature sensor of claim 10, wherein the first electrical temperature signal and the second electrical temperature signal are analog signals including a complementary to absolute temperature (CTAT) characteristic having a negative (−) coefficient with respect to temperature, and the differential electrical temperature signal is an analog signal including a proportional to absolute temperature (PTAT) characteristic having a positive (+) coefficient with respect to temperature.

* * * * *